United States Patent
Kapoor et al.

(10) Patent No.: US 7,343,434 B2
(45) Date of Patent: Mar. 11, 2008

(54) BUFFER MANAGEMENT WITHIN SLS (SIMPLE LOAD STORE) APERTURES FOR INTER-ENDPOINT COMMUNICATION IN ADVANCED SWITCHING FABRIC

(75) Inventors: Randeep Kapoor, Chandler, AZ (US); Mo Rooholamini, Gilbert, AZ (US)

(73) Assignee: Intel Corporation, Santa Ana, CA (US)

( * ) Notice: Subject to any disclaimer, the term of this patent is extended or adjusted under 35 U.S.C. 154(b) by 254 days.

(21) Appl. No.: 11/097,891

(22) Filed: Mar. 31, 2005

(65) Prior Publication Data

US 2006/0224812 A1 Oct. 5, 2006

(51) Int. Cl.
*G06F 13/28* (2006.01)
(52) U.S. Cl. .......................... 710/56; 710/26
(58) Field of Classification Search ............. 710/22, 710/23, 26, 28, 52, 55, 56, 105, 305, 306, 710/308, 310, 313, 315
See application file for complete search history.

(56) References Cited

U.S. PATENT DOCUMENTS

| | | | |
|---|---|---|---|
| 6,119,204 A * | 9/2000 | Chang et al. | 711/141 |
| 6,553,438 B1 * | 4/2003 | Coffman et al. | 710/52 |
| 6,701,425 B1 * | 3/2004 | Dabbagh et al. | 712/225 |
| 6,704,831 B1 * | 3/2004 | Avery | 710/310 |
| 7,058,049 B2 * | 6/2006 | Tanaka et al. | 370/383 |
| 2002/0141426 A1 * | 10/2002 | Tanaka et al. | 370/412 |
| 2004/0218631 A1 * | 11/2004 | Ganfield | 370/474 |
| 2004/0268015 A1 * | 12/2004 | Pettey et al. | 710/313 |
| 2005/0033874 A1 * | 2/2005 | Futral et al. | 710/22 |
| 2006/0004837 A1 | 1/2006 | McQueen et al. | |
| 2006/0101185 A1 * | 5/2006 | Kapoor et al. | 710/308 |
| 2006/0184711 A1 * | 8/2006 | Pettey et al. | 710/316 |
| 2006/0224813 A1 * | 10/2006 | Rooholamini et al. | 710/316 |

OTHER PUBLICATIONS

PCI Express and Advanced Switching: Data Movement Protocols, COST Journal, Oct. 2003.*
Advanced Switching is Protocol-Agnostic, EEimes Online, Apr. 2004.*
Standard Update: PCI Express and Advanced Switching, RTC Magazine, Apr. 2003.*
U.S. Appl. No. 10/816,253, filed Mar. 31, 2004, McQueen et al.

(Continued)

*Primary Examiner*—Khanh Dang
(74) *Attorney, Agent, or Firm*—Marger Johnson & McCollom, P.C.

(57) ABSTRACT

A single copy memory sharing scheme between multiple endpoints in an interconnect architecture may use a buffer management method in an advanced switching fabric having multiple endpoints that divides a simple load and store memory aperture into a buffer descriptor and at least one data buffer, provides offset addressing in the buffer descriptor, and accesses the buffer descriptor by more than one endpoint to allow direct memory access with multiple endpoints in a simple load and store memory aperture. An apparatus may have a memory, and a device associated with the memory, the device to divide the memory into a buffer descriptor and at least one data buffer, and to store offset address information in the buffer descriptor such that another device can access a data buffer in the memory.

24 Claims, 6 Drawing Sheets

OTHER PUBLICATIONS

U.S. Appl. No. 10/982,132, filed Nov. 5, 2004, Rooholamini et al.
U.S. Appl. No. 11/096,749, filed Mar. 31, 2005, Rooholamini et al.
U.S. Appl. No. 11/097,891, filed Mar. 31, 2005, Kapoor et al.
U.S. Appl. No. 11/097,678, filed Mar. 31, 2005, Rooholamini et al.
U.S. Appl. No. 11/108,988, filed Apr. 18, 2005, Rooholamini et al.
U.S. Appl. No. 11/206,548, filed Aug. 17, 2005, Kapoor et al.
U.S. Appl. No. 11/252,158, filed Oct. 17, 2005, Rooholamini et al.
U.S. Appl. No. 11/241,798, filed Sep. 29, 2005, Rooholamini et al.

* cited by examiner

BUFFER MANAGEMENT WITHIN SLS (SIMPLE LOAD STORE) APERTURES FOR INTER-ENDPOINT COMMUNICATION IN ADVANCED SWITCHING FABRIC

BACKGROUND OF THE INVENTION

Computing technologies continue to evolve. Computing designs are incorporating more functionality, higher processing and transmission speeds, smaller sizes, more memory, etc., into smaller more robust architectures. These trends have placed demands on interconnects and data management at the device level.

A conventional interconnect technology is the peripheral component interconnect (PCI) that was initially developed for chip to chip interconnections. Previous improvements in the PCI architecture to provide greater performance have been to increase data widths and increase reference clock frequencies. For example, data widths increased from 32 bits to 64 bits and the reference clock frequency increased from 33.3 megahertz to 66.6 megahertz. Viewed on a system level, these improvements provided an interconnect with higher performance to meet the increasing performance demands brought on by other computing improvements. As architectures evolved and bottlenecks emerged, interconnect technologies have continually had to adapt to best support processing and communication with peripheral components and functionalities.

Interconnect technology has continued to evolve. The example conventional interconnect approach above, PCI, was updated with PCI Express. The changes from PCI to PCI Express represent general improvement trends in the interconnect space. For example, previous interconnect approaches shared parallel bus implementations that became a hindrance with increased reference clock frequencies. Furthermore, higher bandwidth bus segments restricted the number of loads on each segment to essentially a point-to-point interconnection. An advancement over these interconnect technologies utilizes numerous point-to-point interconnections called links, instead of the parallel bus segments. Links may consist of one or more lanes and each lane in turn generally includes a set of differentially driven pairs of bidirectional signal wires. A reduction in bus size from the shared parallel bus implementations was accompanied by incorporating some control and clocking information into the data stream instead of having separate hardware lines between devices. Adoption of this new functionality has been limited, however, and conventionally includes the integrated reference clock into communicated bit streams, addressing information and limited control information.

Interconnect architecture has received even more functionality and improvements. For example, Advanced Switching Interconnect (ASI), sometimes referred to as advanced switching, extends PCI Express functionality to support direct endpoint to endpoint communications channels via logical paths. This allows concurrent logical interconnects that each connect a specific set of resources. Furthermore, ASI can be separated into fabric specific routing and protocol specific Protocol Interfaces, allowing scaling of an ASI fabric as well as support for various protocols. However, conventional interconnect technologies even with recent architectural changes have provided insufficient management of data buffers within an ASI Fabric.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, interconnect architectures previously had bus arbitration methods to determine which device may use an interconnect. For example, a device may connect through a PCI bus to a chipset and a processor. As performance needs increased, the bus arbitration method was insufficient and methods were developed for a packet based interconnect architecture. The shift of these conventional interconnect architectures to packet based data and control communication systems solved some problems but introduced others. An example interconnect evolution is from a PCI interconnect system to a PCI Express system. Functionality has been added on top of newer generation interconnect fabrics, but this functionality is still very limited. An example is advanced switching which provides packet routing functionality at the interconnect level, and additionally, simple load and store, which addresses management of memory in advanced switching fabrics. Embodiments provide buffer management techniques for inter device communications in interconnect fabrics. One embodiment provides buffer management within simple load store apertures for inter endpoint communication in an ASI fabric.

Figure 1:
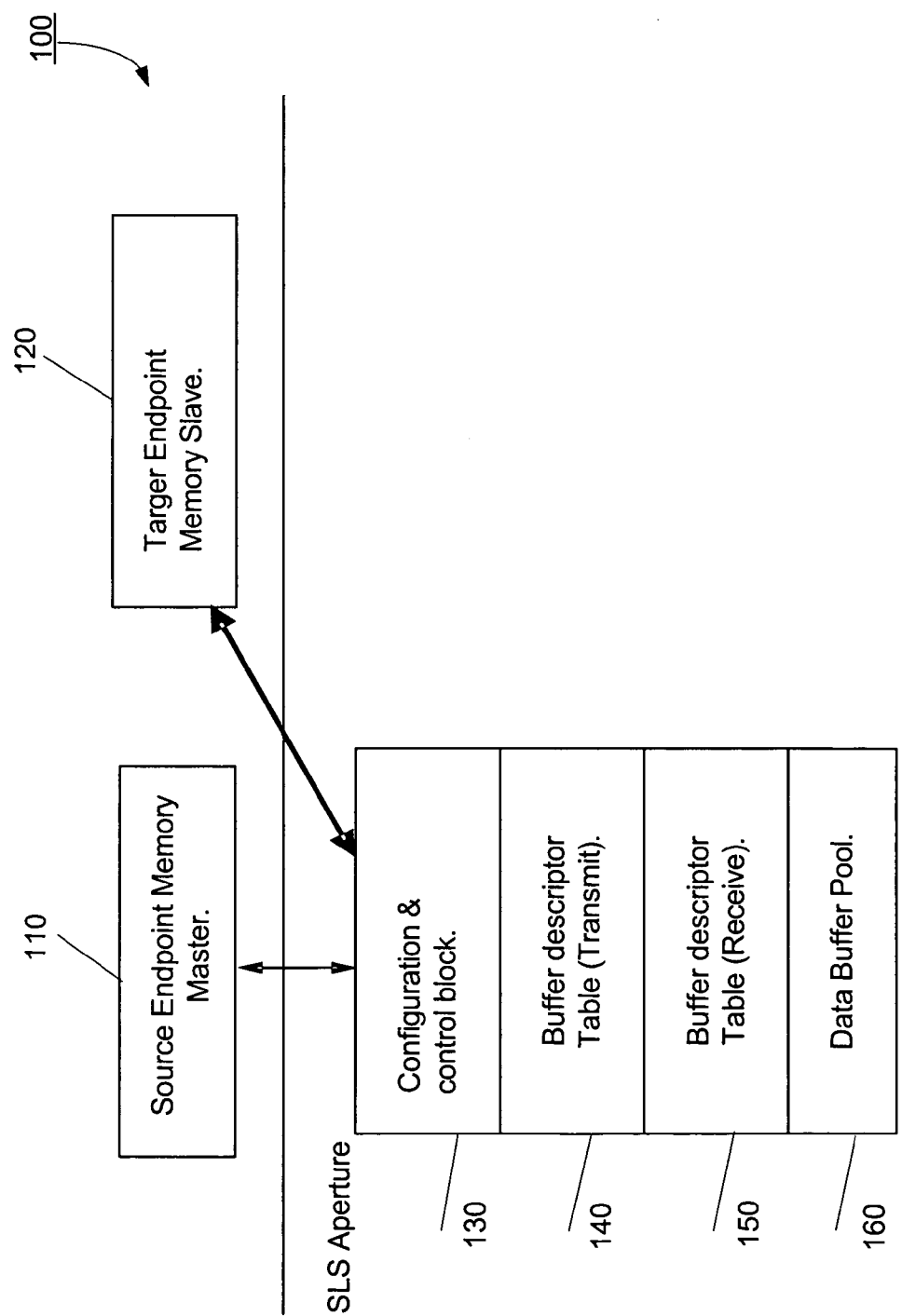
FIG. 1 illustrates a memory aperture according to an embodiment allowing access to the memory to a master device and a slave device.

FIG. 1 illustrates a memory aperture in an interconnect fabric according to an embodiment 100 allowing memory access to a master device 110 and a slave device 120. An exemplary embodiment as illustrated in FIG. 1 comprises a source endpoint memory master 110, a target endpoint memory slave 120 and an SLS aperture comprising a configuration and control block 130, a buffer descriptor table 140 for transmit control, a buffer descriptor table 150 for receive control, and a data buffer pool 160.

In the present embodiment, an SLS aperture may logically partition, or organize an interconnect device's internal data structures. For example, an ASI device's local configuration and control resources may be organized into up to 16 regions or apertures, each of which may have data grouped by similar attributes and/or access rights. Embodiments of the present invention may manage buffers and maintain multiple communication channels within an aperture. Some embodiments may manage data buffers within SLS apertures in an ASI fabric.

In the present embodiment, buffer descriptors, such as the transmit buffer descriptor table 140 and the receive buffer descriptor table 150 in FIG. 1, may be stored in the initial memory within an aperture while data buffers are stored in the remaining aperture memory. Some embodiments may provide direct memory access (DMA) for data transfer between peer devices in an interconnect architecture such as an ASI fabric including PCI express devices. An embodiment may perform unicast or multicast communication using a buffer descriptor within an SLS aperture. In the present embodiment data transfer between peer devices or components is allowed without locking buffer descriptors.

An embodiment may include two devices on a system, the two devices may share system memory in a direct memory access (DMA) operation. Another embodiment may comprise two devices residing on different systems and include a remote transfer between the devices but still share memory in a remote DMA (RDMA) operation. RDMA may be implemented across a network, such as an ASI fabric, between memories located on different machines. In some embodiments, devices residing on separate systems may access the memory aperture according to this detailed description.

Advanced switching based endpoints require a buffer management mechanism for peer communication. An embodiment of the present invention may manage data buffers within various SLS apertures in the ASI fabric.

In an embodiment, an endpoint may be a device that exchanges information with a peer endpoint device by routing data packets through switches in an ASI fabric. The present embodiment may include a messaging agent module in each endpoint device and peer messaging agent modules may communicate among each other for data transfer.

In an SLS architecture, embodiments transmit data in the form of SLS packets. Some embodiments provide a communication channel to exchange information between endpoints which are part of the same ASI fabric, for example, by implementing a one copy transfer mechanism.

In an exemplary embodiment, the communication may be performed by sharing an SLS aperture among two endpoints. In this example, the aperture number, starting offset and size of the SLS window to be used for a particular communication may be negotiated at the protocol negotiation stage. Currently, according to the SLS specification, each EP can support up to 4096 SLS apertures (12 bit field).

An embodiment may begin protocol negotiation by deciding an SLS window owner. SLS supports two data communication models, a push model and a pull model. An embodiment may decide the owner of an aperture with the following rules. If an endpoint is reading over a push model connection, that endpoint is the owner of the SLS aperture, that is, the SLS aperture resides locally on this endpoint. If the endpoint is writing over a pull model connection, this endpoint is the owner of the SLS aperture. Otherwise, the remote endpoint in a peer to peer connection is responsible for maintaining the SLS aperture.

In the present embodiment, an SLS aperture owner is called a memory master (master EP) while a peer endpoint is called the memory slave (slave EP). A master EP may be the endpoint that allocates and frees memory. Furthermore, the master EP may configure memory and stores the configuration at a well-known, predefined location called configuration and control block (CCB). The slave EP reads the configuration from the CCB and uses the memory according to the configuration. An endpoint can be a master EP in one connection while slave EP in another connection at the same time.

Referring to FIG. 1, an embodiment may comprise a source endpoint memory master 110, a target endpoint memory slave 120 and an SLS aperture comprising a configuration and control block 130, a buffer descriptor table 140 for transmit control, a buffer descriptor table 150 for receive control, and a data buffer pool 160.

In the present embodiment, the SLS aperture window may comprise a configuration memory that includes the configuration and control block 130, the transmit buffer descriptor table 140 and the receive buffer descriptor table 150. Additionally, the SLS aperture window may comprise a data memory that may further comprise data buffer pool 140. In an embodiment the data buffer pool 140 may be used to store messages to transfer.

According to the present embodiment, each entry in the receive and transmit buffer descriptor tables, 150 and 140 respectively, may contain a status byte, a data length and data offset, and a sender's reference and destination route. Furthermore, the status byte may contain an empty bit (E) bit, a released bit (R), a first descriptor bit (F), a last descriptor bit (L), and a wrap bit (W).

The present embodiment may represent that the descriptor contains valid information and/or contains a data buffer with valid information when the E bit is set to 0 and that the descriptor is empty or a data buffer pointed to by this descriptor is empty if the E bit is 1. An embodiment may use the R bit to represent either that a data buffer associated with a descriptor is released or that a data buffer associated with that descriptor has been used and is ready to be released. Furthermore, an embodiment may use an F bit to represent either that a descriptor is or is not the first descriptor of a chain. Similarly, an embodiment may use an L bit to represent that a descriptor is or is not the last descriptor of a chain. In an embodiment, a W bit may be used to represent a descriptor is or is not the last descriptor in a descriptor table.

Referring to FIG. 1, an embodiment may include a configuration and control block 130 that contains a master EP status bit, a slave EP status bit, Tx table offset, a Tx table size, an Rx table offset and an Rx table size. In the present embodiment, master and slave status bits may represent whether the respective entity is up or down, for example, a master status bit may indicate the status of memory owner messaging agent while slave status bit may indicate the same for a memory user messaging agent. In an embodiment, each messaging agent may increment its variable at a periodic interval and also may read a counter for its communication peer. In this example, if the peer process does not increment its variable, it may indicate the peer node has failed.

In the present embodiment, a Tx table offset may be used to point to a transmit buffer descriptor table (TxBDT), and an Rx table offset may be used to point to a receive buffer descriptor table (RxBDT). In these embodiments, "transmit" and "receive" are named with respect to memory master. During initial configuration, a write pointer of the memory master and a read pointer of the memory slave may point to the start of TxBDT table, and a write pointer of the memory slave and a read pointer of the memory master may point to the start of RxBDT table.

In this example, the sender may have a write pointer to write information into a descriptor and the recipient may have a read pointer to read information from the descriptor. In an embodiment, a pointer is writable only by its owner. In an embodiment, these pointers always increment and therefore browse the table in one direction, furthermore pointers may be wrapped around the end of the table making it circular. The present example uses status bits of a descriptor to determine ownership at any point of time, and consequently may avoid locking.

In some embodiments, endpoints do not contend for memory. A master EP may have a pool of buffers in an SLS aperture and use it to transmit data. Furthermore, a master EP may supply data buffers to a slave EP through the RxBDT and may avoid memory contention.

Some embodiments provide a one copy data transfer mechanism for inter-endpoint communication with ASI fabric. For example, a master EP never needs to copy data since it owns the memory. However, a slave EP may copy the data from a shared SLS aperture to its local memory or vice versa.

Figure 2:
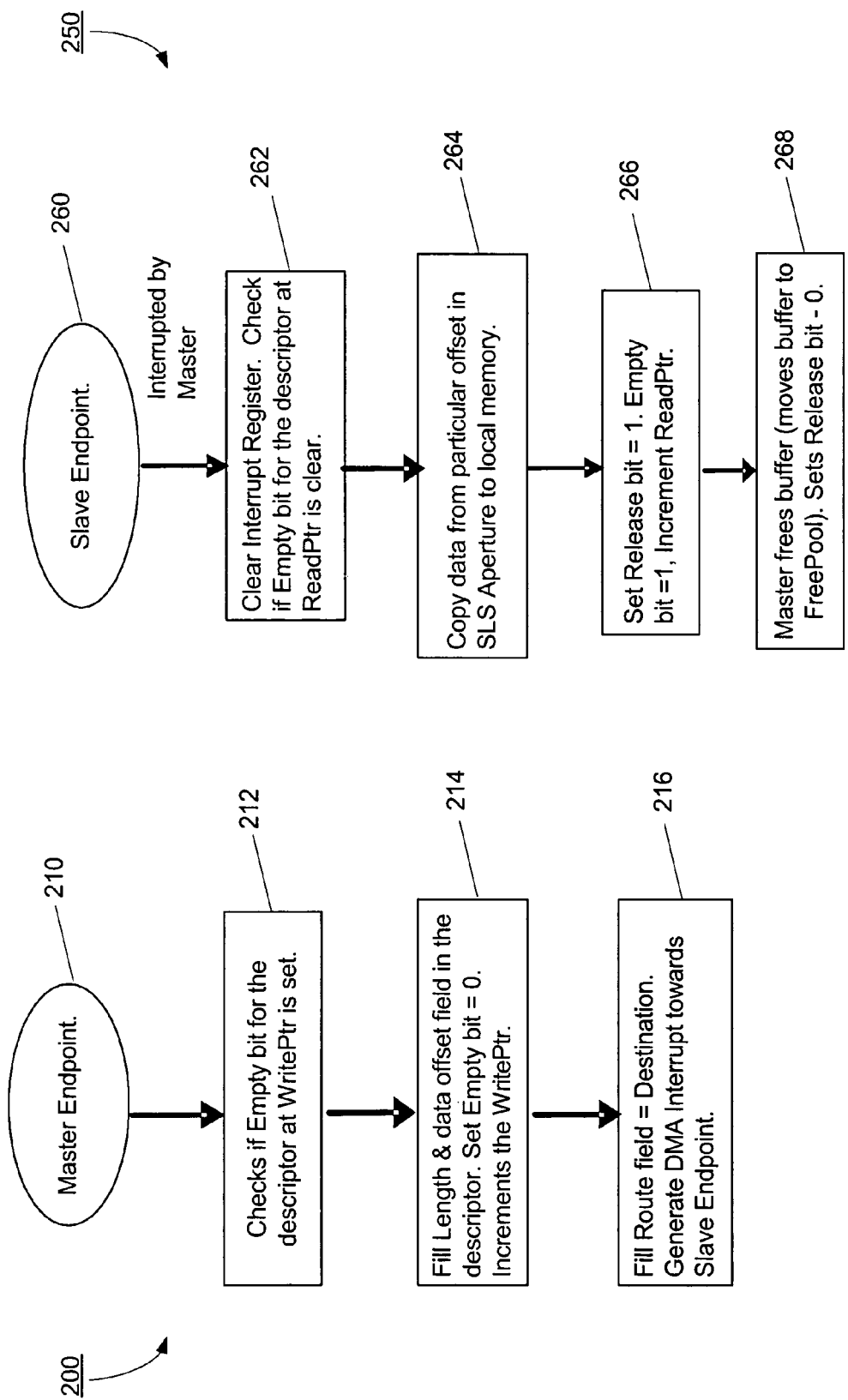
FIG. 2 illustrates a master endpoint to slave endpoint communication.

FIG. 2 illustrates a master endpoint to slave endpoint communication represented by flow diagrams 200 and 250. According to flow diagram 200, at configuration time, the status fields of all descriptors may be kept empty, such as by setting the E bit to 1. In block 212, a master EP may check whether the descriptor pointed by the write pointer is free to use by checking if the E bit for that descriptor is set to 1. If it is empty, in block 214 the master EP may fill the length field to a data length and the data offset field to the start byte offset of the data. According to the present embodiment, the master EP may then update the status field by setting the E bit to 0 and also increment the write pointer. In block 216 the master EP may generate a DMA interrupt towards the slave EP. In an embodiment, a reference to the data buffer, such as a pointer to the data buffer structure, may be stored in the sender's reference field and the master endpoint may then fill the descriptor's route field with the communication ID of a destination EP.

According to flow diagram 250 in block 262, on receipt of an interrupt a slave EP may read the status field of a descriptor. In an embodiment the status field of a descriptor may be pointed to by a read pointer. The interrupt status may be cleared and a descriptor pointed by the read pointer may be checked to verify its E bit is 0 and it is filled with valid information. In block 264, if the descriptor is valid, a slave EP can extract information using the data offset and length fields. Since the slave EP does not own the buffer pool, it may allocate a buffer from its local buffer pool and copy the data from the SLS aperture to its local memory. In block 266, once the descriptor is used, the release bit in a status field is updated by setting the R bit to 1, and the read pointer is incremented by the slave EP. In block 268, the data buffer is freed by the master EP if the R bit is set in the descriptor. Once the buffer is freed, the R bit is set to 0 and the E bit is set to 1. At this stage, the descriptor is free to be used by the master EP again.

Figure 3:
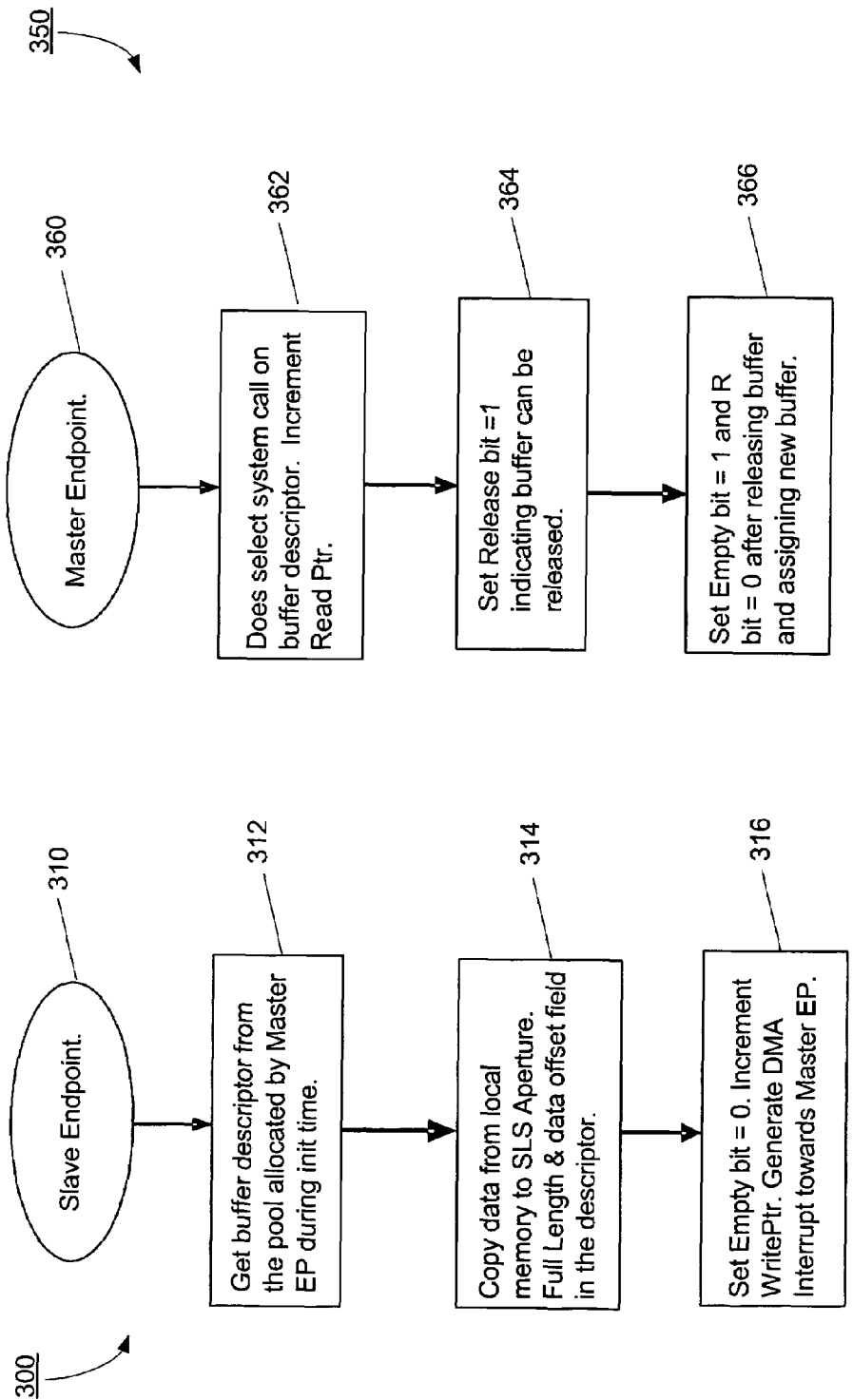
FIG. 3 illustrates a slave endpoint to master endpoint communication.

FIG. 3 illustrates a slave endpoint to master endpoint communication. Referring to flow diagram 300, in block 312 a slave endpoint may get a buffer descriptor from a pool allocated by a master EP during initialization. In an embodiment, during initial configuration, a master EP may allocate data buffers from the SLS aperture data buffer pool for its use and fills the descriptors of the RxBDT with data length and data offset. This is computed from the allocated data buffer. It keeps the data buffer reference in the sender's reference field. After it receives the buffer descriptor it may copy data from a local memory to an SLS aperture, in block 314.

In an embodiment, when slave EP allocates a descriptor, the descriptor may contain valid length and data offset fields. In this case, a slave EP can copy data from its local memory to the offset in the SLS aperture pointed by the descriptor. In block 316, a slave EP may change the status byte (sets E bit=0) and increment the write pointer. Referring to flow diagram 350, according to the present embodiment, if a master EP finds a filled descriptor, it may extract the data buffer from the descriptor, use it, and free the buffer, declare the descriptor free by changing the status (sets R bit=1). The master EP may increment the read pointer. A separate thread in the master EP may then check descriptors, such as by checking if their R bit is set=1. When that thread finds a descriptor with an R bit set to 1, it fills the descriptor with a new buffer, clears the R bit and sets the E bit. In an embodiment this may be done by setting the R bit equal to 0 and the E bit equal to 1.

Embodiments of the present invention may include an apparatus and method for a single copy memory sharing scheme between multiple endpoints in an interconnect architecture. An embodiment may comprise a buffer management method in an advanced switching fabric having multiple endpoints that divides a simple load and store memory aperture into a buffer descriptor and at least one data buffer, provides offset addressing in the buffer descriptor, and accesses the buffer descriptor by more than one endpoint to allow direct memory access with multiple endpoints in a simple load and store memory aperture. Another embodiment may be an apparatus comprising a memory, and an device associated with the memory, the device to divide the memory into a buffer descriptor and at least one data buffer, and to store offset address information in the buffer descriptor so another device can access a data buffer in the memory.

Figure 4:
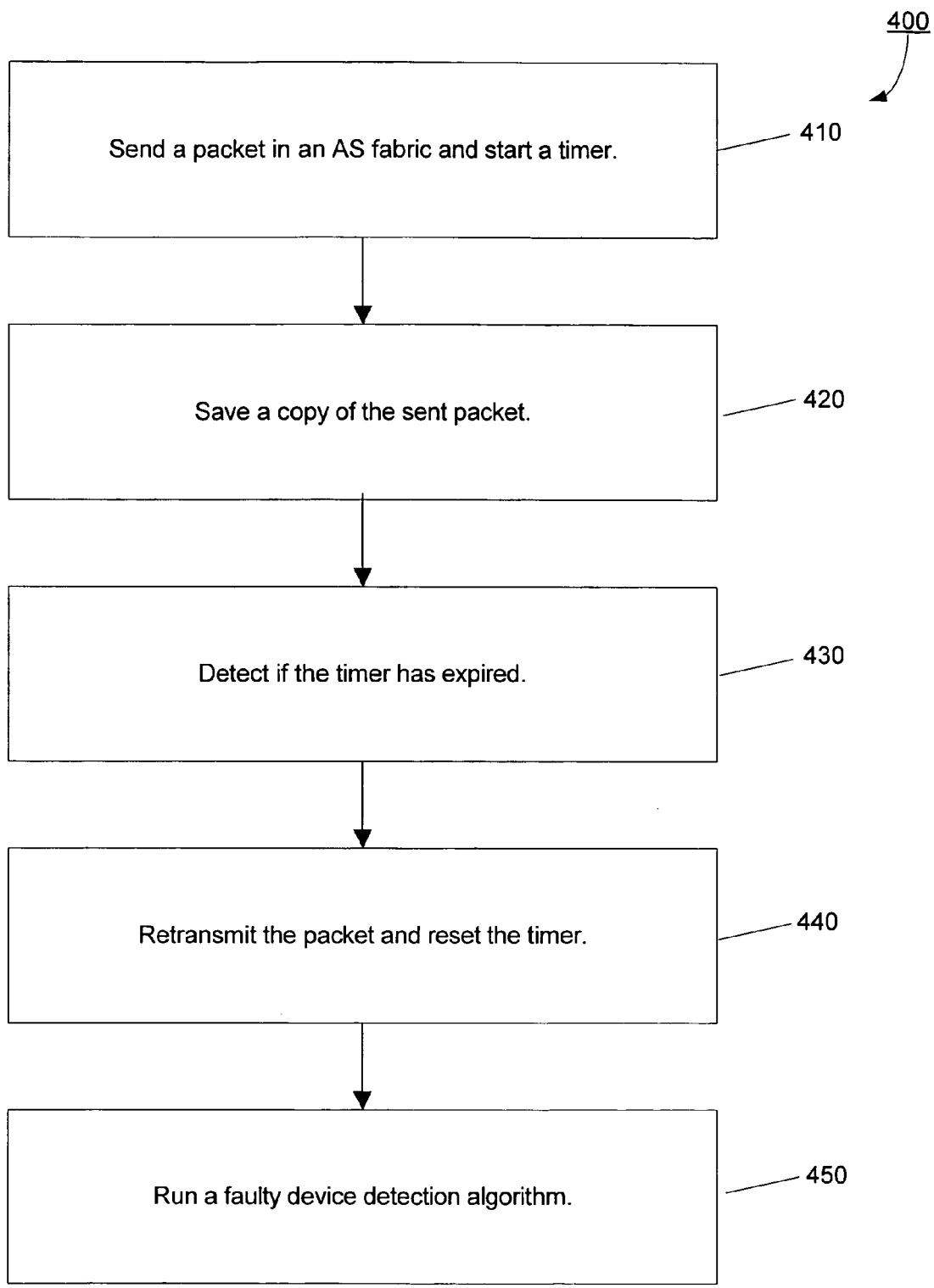
FIG. 4 illustrates a flow diagram of a method for buffer management within simple load store (SLS) apertures for inter-endpoint communication in an ASI fabric.

FIG. 4 illustrates a flow diagram of a method 400 for buffer management within SLS apertures for inter-endpoint communication in an ASI fabric. In block 410, a device sends a packet in an ASI fabric and starts a timer. In block 420, a device saves a copy of the sent packet. In block 430, a device detects if the timer has expired. In block 440, a device retransmits the packet and resets the timer. In block 450, the method runs a faulty device detection algorithm.

Figure 5:
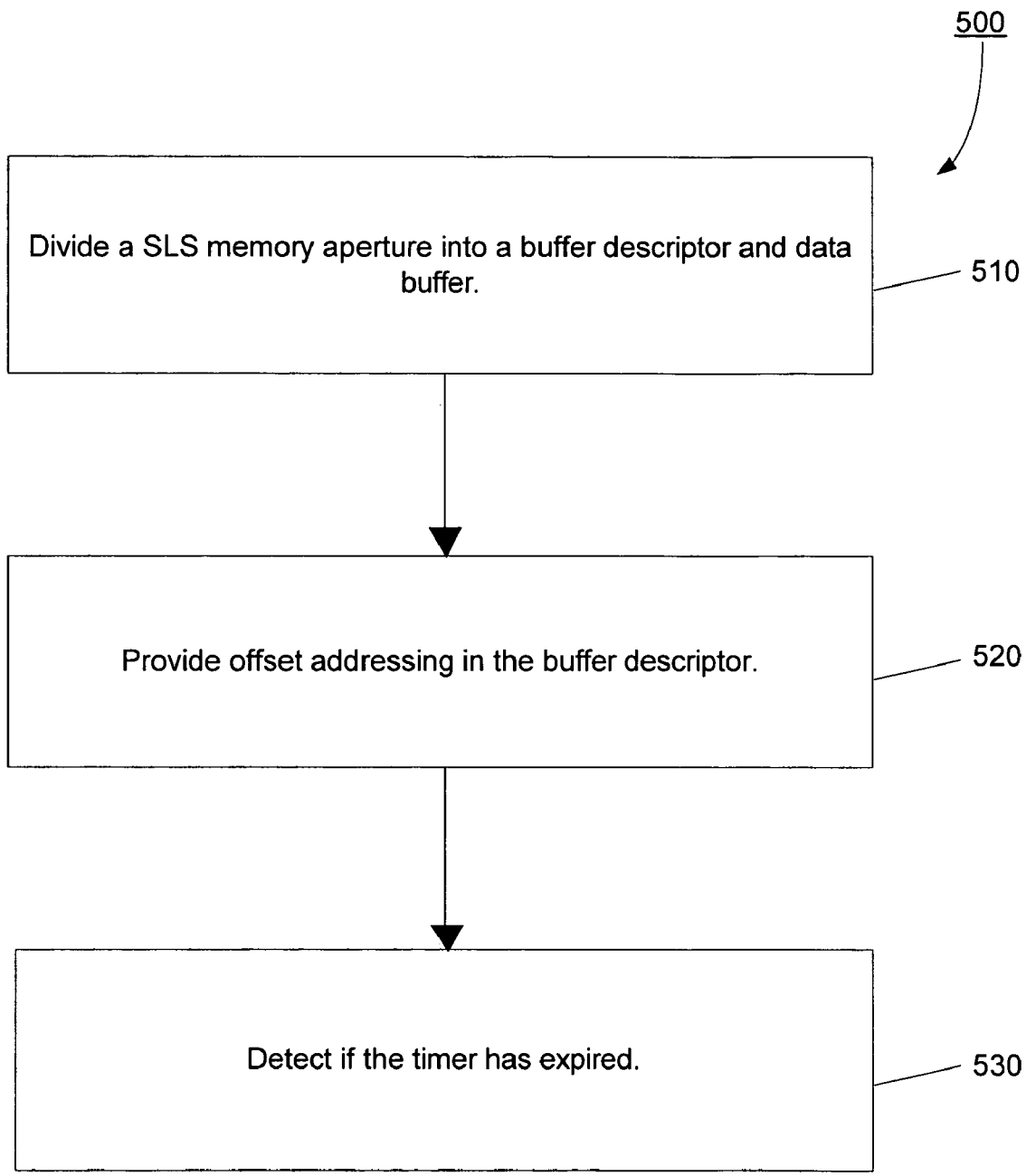
FIG. 5 illustrates a flow diagram of a method for buffer management within SLS apertures for inter-endpoint communication in an ASI fabric.

FIG. 5 illustrates a flow diagram of a method 500 for buffer management within SLS apertures for inter-endpoint communication in an ASI fabric. In block 510, a device divides a memory aperture into a buffer descriptor and a data buffer. In block 520, a device provides offset addressing in the buffer descriptor. In block 530, the method provides that the buffer descriptor is accessed by more than one endpoint.

Figure 6:
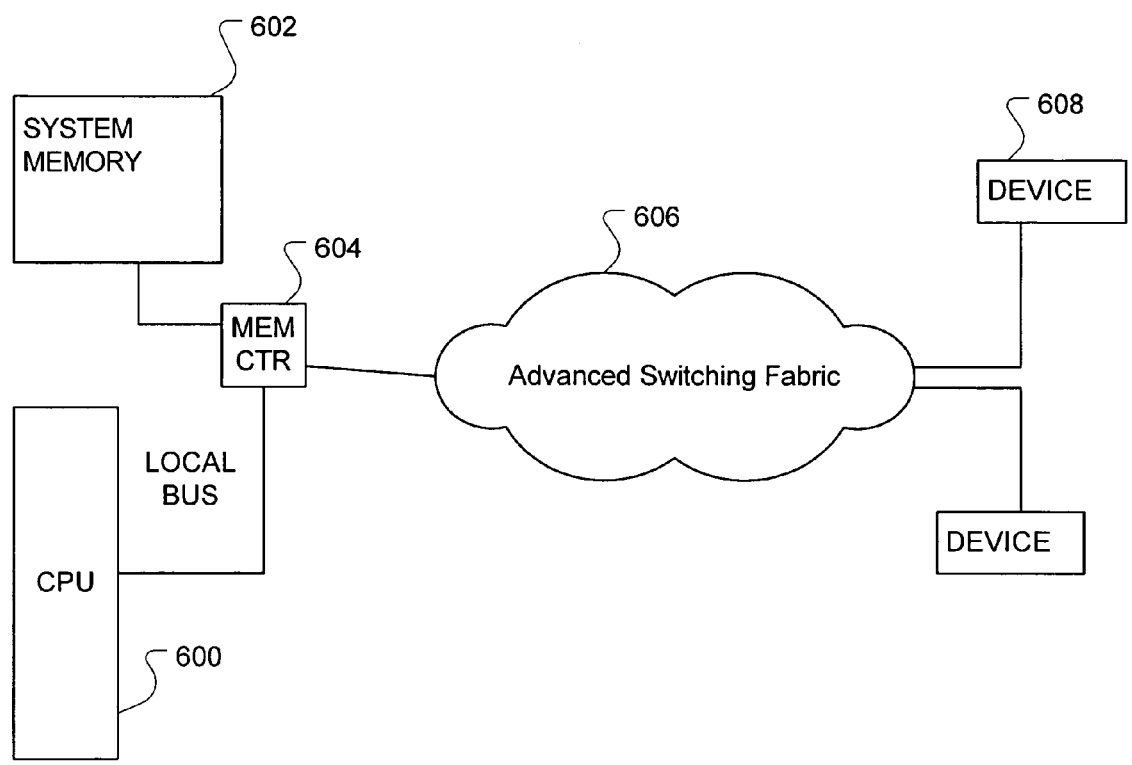
FIG. 6 illustrates an embodiment apparatus to provide buffer management within simple load store apertures for inter endpoint communication in an ASI fabric.

FIG. 6 illustrates an embodiment apparatus to conduct the process as disclosed above. The device has a cpu 600 coupled to a memory controller 604 with a local bus. The memory controller 604 connects to a memory system 602. Memory controller 604 is coupled to an advanced switching fabric 606 which is further coupled to at least one device 608. The embodiment in FIG. 6 is an example of an apparatus that may execute instructions and perform processes as disclosed herein, but the invention is not so limited, any device with hardware having respective characteristics of the other examples in this description and an ability to process instructions, may satisfy the same role.

Some embodiments may be an article of machine-readable medium containing instructions that, when executed, cause a machine to divide a simple load and store memory aperture into a buffer descriptor and at least one data buffer, provide offset addressing in the buffer descriptor, and access the buffer descriptor by more than one endpoint to allow direct memory access with multiple endpoints in a simple load and store memory aperture. In an embodiment, the article may further cause a machine to negotiate an aperture number, a start offset, and a size of a simple load and store window at a protocol negotiation stage, or may transmit data in simple load and store packets.

An embodiment may comprise a memory and an Advanced Switching endpoint associated with the memory, the endpoint to divide the memory into a buffer descriptor and at least one data buffer, and to store offset address information in the buffer descriptor so another endpoint can access a data buffer in the memory. Example endpoints may be memory controller 604, device 608, or any other ASI capable device coupled with advanced switching fabric 606.

In an embodiment, the buffer descriptor may contain a configuration and control block, a transmit buffer descriptor table, and a receive buffer descriptor table. The present embodiment may further have each buffer descriptor table entry contain a status byte, a data length and data offset, and a sender reference and destination route. In an embodiment, the configuration and control block may contain a master endpoint status bit, a slave endpoint status bit, a transmit table offset, a transmit table size, a receive table offset, and a receive table size. The present embodiment may further have the transmit table offset be a pointer to the transmit buffer descriptor table, and the receive table offset be a pointer to the receive buffer descriptor table.

Some embodiments of the present invention may be a system comprising a first endpoint in an advanced switching fabric, a second endpoint in the advanced switching fabric, and a memory associated with the first endpoint, the first endpoint to divide the memory into a buffer descriptor and at least one data buffer, and to store offset address information in the buffer descriptor so the second endpoint can access a data buffer in the memory. An embodiment may provide a buffer descriptor that contains a configuration and control block, a transmit buffer descriptor table, and a receive buffer descriptor table. In some embodiments, each buffer descriptor table entry may contain a status byte, a data length and data offset, and a sender reference and destination route. In the present embodiment, the configuration and control block may contain a master endpoint status bit, a slave endpoint status bit, a transmit table offset, a transmit table size, a receive table offset, and a receive table size. Furthermore, the transmit table offset in the present embodiment may be a pointer to the transmit buffer descriptor table, and the receive table offset may be a pointer to the receive buffer descriptor table.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A buffer management method in an advanced switching fabric having multiple endpoints comprising:
   dividing a simple load and store memory aperture into a buffer descriptor and at least one data buffer;
   providing offset addressing in the buffer descriptor;
   negotiating an aperture number, starting offset, and size of a simple load and store window at a protocol negotiation stage; and
   accessing the buffer descriptor by more than one endpoint to allow direct memory access with multiple endpoints in the simple load and store memory aperture.

2. The method of claim 1, further comprising transmitting data in simple load and store packets.

3. The method of claim 1, further comprising:
   checking an empty flag for a buffer descriptor indicated by a write pointer;
   filling a length and data offset field in the buffer descriptor;
   updating the empty flag;
   incrementing the write pointer; and
   filling a route field in the buffer descriptor with a destination.

4. The method of claim 3, further comprising generating a direct memory access interrupt to a slave endpoint.

5. The method of claim 3, further comprising by a slave endpoint:
   clearing an interrupt register; and
   checking an empty flag for a buffer descriptor indicated by a read pointer.

6. The method of claim 5, further comprising copying data from the simple load and store aperture to local memory.

7. The method of claim 6, wherein the data is addressed using the data offset field in the buffer descriptor indicated by the read pointer.

8. The method in claim 6, further comprising:
   setting a release flag; and
   incrementing the read pointer.

9. The method of claim 8, further comprising:
   freeing a buffer associated with the buffer descriptor previously indicated by the read pointer;
   resetting the release flag; and
   setting the empty flag.

10. The method of claim 1, wherein the offset addressing in the buffer descriptor provides an offset in the at least one data buffer.

11. A machine-readable medium storing an article of machine-readable code containing instructions that, when executed, cause a machine to:
    divide a simple load and store memory aperture into a buffer descriptor and at least one data buffer;
    provide offset addressing in the buffer descriptor;
    negotiate an aperture number, a start offset, and a size of a simple load and store window at a protocol negotiation stage; and
    access the buffer descriptor by more than one endpoint to allow direct memory access with multiple endpoints in the simple load and store memory aperture.

12. The machine-readable medium of claim 11, further containing instructions that, when executed, cause a machine to transmit data in simple load and store packets.

13. The machine-readable medium of claim 11, further comprising instructions that, when executed, cause the machine to:
    check an empty flag for a buffer descriptor indicated by a write pointer;
    fill a length and data offset field in the buffer descriptor;
    update the empty flag;
    increment the write pointer; and
    fill a route field in the buffer descriptor with a destination.

14. The machine-readable medium of claim 13, further comprising instructions that, when executed, cause the machine to generate a direct memory access interrupt to a slave endpoint.

15. The machine-readable medium of claim 13, further comprising instructions that, when executed, cause the machine to:

clear an interrupt register by a slave endpoint; and check an empty flag for a buffer descriptor indicated by a read pointer.

16. The machine-readable medium of claim 15, further comprising instructions that, when executed, cause the machine to copy data from the simple load and store aperture to local memory.

17. The machine-readable medium of claim 16, wherein the data is addressed using the data offset field in the buffer descriptor indicated by the read pointer.

18. The machine-readable medium in claim 16, further comprising instructions that, when executed, cause the machine to:

set a release flag; and increment the read pointer.

19. The machine-readable medium of claim 18, further comprising instructions that, when executed, cause the machine to:

free a buffer associated with the buffer descriptor previously indicated by the read pointer;

reset the release flag; and set the empty flag.

20. An apparatus comprising:

a memory; and an Advanced Switching endpoint coupled to the memory, the endpoint to:

divide a simple load and store memory aperture of the memory into a buffer descriptor and at least one data buffer, store offset address information in the buffer descriptor;

negotiate an aperture number, starting offset, and size of a simple load and store window at a protocol negotiation stage, and wherein another endpoint can access a data buffer in the simple load and store memory aperture of the memory by accessing the buffer descriptor.

21. The apparatus of claim 20, wherein the buffer descriptor contains a configuration and control block, a transmit buffer descriptor table, and a receive buffer descriptor table.

22. The apparatus of claim 21, wherein:

the transmit buffer descriptor table and the receive buffer descriptor table each include at least one buffer descriptor table entry; and each buffer descriptor table entry contains a status byte, a data length and data offset, and a sender reference and destination route.

23. The apparatus of claim 21, wherein the configuration and control block contains a master endpoint status bit, a slave endpoint status bit, a transmit table offset, a transmit table size, a receive table offset, and a receive table size.

24. The apparatus of claim 23, wherein:

the transmit table offset is a pointer to the transmit buffer descriptor table, and the receive table offset is a pointer to the receive buffer descriptor table.

* * * * *